O. M. Pike,
Glass-Cutting Machine.
Nº 85,396.     Patented Dec. 29, 1868.
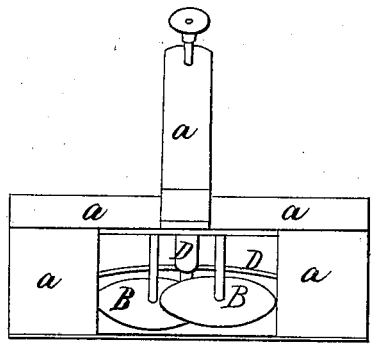
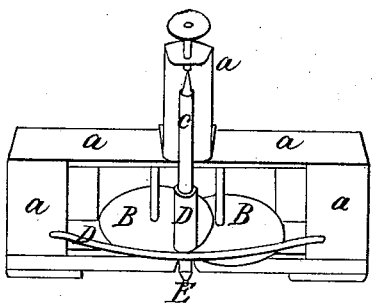
Witnesses
Austin DeWolf
Wendell P. Davis
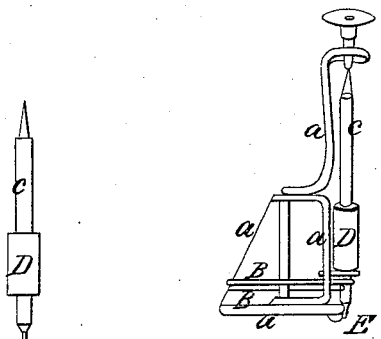
Inventor
O. M. Pike

OZI M. PIKE, OF LEVERETT, MASSACHUSETTS, ASSIGNOR TO HIMSELF, WENDELL T. DAVIS, AND AUSTIN DE WOLF.

Letters Patent No. 85,396, dated December 29, 1868.

IMPROVED MACHINE FOR CUTTING VITREOUS SUBSTANCES.

The Schedule referred to in these Letters Patent and making part of the same.

Be it known that I, OZI M. PIKE, of Leverett, in the county of Franklin, and State of Massachusetts, have invented a new and useful Machine for Cutting Vitreous and other like Substances; and I do hereby declare that the following is a full, clear, and exact description of the construction and operation of the same, reference being had to the annexed drawings, making a part of this specification, in which—

A represents the frame-work, which may be of any design or shape.

B B, friction-wheels.

C, the cutter, consisting of a round piece of hardened steel, turning, near one end, on the friction-wheels, and at the other end in a socket in a thumb-screw, also of hardened steel. The object of the thumb-screw, friction-wheels and the steel socket is to make the friction on the cutter, when in use, as little as possible.

D D are guards, to prevent the cutter from slipping or falling out of its place.

If the cutter becomes dull, it may be sharpened by a common hone or whetstone, passed across the end, at right angles to the longitudinal diameter of the cutter.

The thumb-screw may be used to adjust the position of the cutter.

To cut vitreous or other like substances, place the point E of the cutter C on the surface to be cut, and draw the side of the frame along the straight edge or pattern, pressing upon it at the same time. A fine line or scratch will be made in the glass, similar to that made by a diamond.

What I claim as my invention, and desire to secure by Letters Patent, is—

A tool for cutting glass or other vitreous substance, constructed to operate substantially as described.

OZI M. PIKE.

Witnesses:
AUSTIN DE WOLF,
WENDELL P. DAVIS.